United States Patent
Pyzik et al.

(10) Patent No.: US 8,030,234 B2
(45) Date of Patent: Oct. 4, 2011

(54) ALUMINUM BORON CARBIDE COMPOSITE AND METHOD TO FORM SAID COMPOSITE

(75) Inventors: Aleksander J. Pyzik, Midland, MI (US);
Robert A. Newman, Midland, MI (US);
Mark A. Chartier, Gladwin, MI (US);
Amy M. Wetzel, Midland, MI (US);
Christopher N. Haney, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 108 days.

(21) Appl. No.: 12/575,090

(22) Filed: Oct. 7, 2009

(65) Prior Publication Data

US 2010/0104843 A1  Apr. 29, 2010

Related U.S. Application Data

(60) Provisional application No. 61/108,570, filed on Oct. 27, 2008.

(51) Int. Cl.
*C04B 35/563* (2006.01)
*C04B 35/58* (2006.01)

(52) U.S. Cl. .................... 501/87; 501/96.3

(58) Field of Classification Search ............. 501/87, 501/96.3; 264/643, 658
See application file for complete search history.

(56) References Cited

U.S. PATENT DOCUMENTS

| | | |
|---|---|---|
| 4,702,770 A | 10/1987 | Pyzik et al. |
| 4,834,938 A | 5/1989 | Pyzik et al. |
| 5,039,633 A | 8/1991 | Pyzik et al. |
| 5,298,468 A | 3/1994 | Pyzik |
| 5,394,929 A | 3/1995 | Pyzik et al. |
| 5,508,120 A * | 4/1996 | Pyzik et al. ............. 428/688 |
| 5,521,016 A | 5/1996 | Pyzik et al. |
| 5,595,622 A | 1/1997 | Pyzik et al. |
| 5,878,849 A | 3/1999 | Prunier, Jr. et al. |
| 5,900,277 A | 5/1999 | Fox et al. |
| 5,957,251 A | 9/1999 | Jones et al. |
| 6,123,797 A | 9/2000 | Pyzik et al. |
| 6,200,526 B1 | 3/2001 | Fox et al. |
| 6,296,045 B1 | 10/2001 | Fox et al. |
| 6,458,466 B1 | 10/2002 | Jones et al. |
| 6,630,247 B1 | 10/2003 | Fox et al. |
| 6,835,349 B2 | 12/2004 | Pyzik et al. |
| 7,160,627 B2 | 1/2007 | Pyzik et al. |
| 2008/0014455 A1 | 1/2008 | Pyzik et al. |

FOREIGN PATENT DOCUMENTS

| | | |
|---|---|---|
| WO | 2004092430 | 10/2004 |
| WO | 2008048999 | 4/2008 |

* cited by examiner

*Primary Examiner* — Karl Group

(57) ABSTRACT

An improved aluminum-boron carbide (ABC) composite has been discovered that is comprised of a continuous network of $AlB_{24}C_4$ and boron carbide grains having therein other isolated aluminum-boron carbide reactive phases and at most 2% by volume of isolated metal. The improved ABC composite may be formed by forming boron carbide particulates into a porous body that has a porosity of at most about 35%, where the boron particulates have been heat treated to a temperature of 1200° C. to 1800° C., infiltrating the porous body with aluminum or aluminum alloy until an infiltrated aluminum-boron carbide body is formed that has at most about 1% porosity, heat treating the infiltrated body for at least 25 hours at 1000° C. to 1100° C. to form an aluminum boron carbide composite having a continuous network of $AlB_{24}C_4$ and boron carbide, and subsequently heat-treating to 700° C. to 900° C. to form the improved aluminum boron carbide composite.

6 Claims, 1 Drawing Sheet

(50x Magnification)

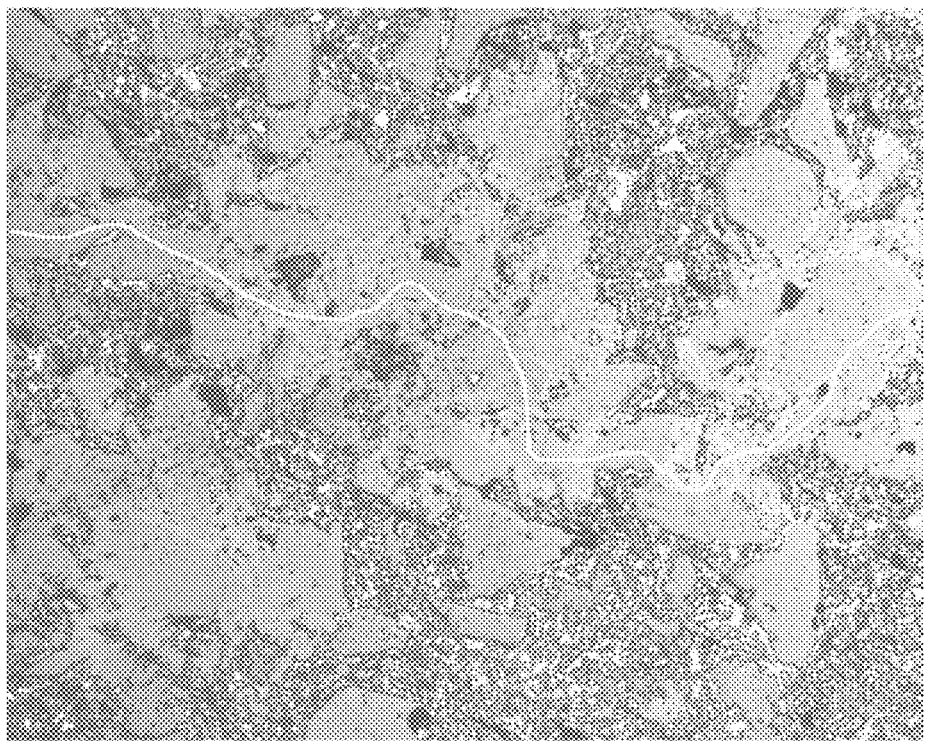
(50x Magnification)
FIGURE

ALUMINUM BORON CARBIDE COMPOSITE AND METHOD TO FORM SAID COMPOSITE

CROSS-REFERENCE TO RELATED APPLICATION(S)

This application claims benefit of priority from U.S. Provisional Patent Application No. 61/108,570, filed Oct. 27, 2008, which application is incorporated by reference herein in its entirety.

FIELD OF THE INVENTION

This invention relates to aluminum boron carbide composites.

BACKGROUND OF THE INVENTION

Infiltrated aluminum-boron carbide (ABC) composites are known. They have been proposed as a replacement for costly hot pressed boron carbide ceramics. In making high ceramic content ABC composites, the aluminum must be reacted to form aluminum boride, aluminum borocarbide or aluminum carbide ceramic phases. Unfortunately, the ABC composites made to date have suffered from the need to start with expensive fine boron carbide powder or lack of impact strength due to the ceramic phases formed not providing a strong hard impact resistant composite that can provide the wear of a ceramic.

Accordingly, it would be desirable to provide a material that overcomes one or more of the problems of the prior art such as one of those described above. It would also be desirable to provide a method of preparing the material.

SUMMARY OF THE INVENTION

A first aspect of the invention is an improved aluminum-boron carbide composite comprised of a continuous network of $AlB_{24}C_4$ and boron carbide grains having therein other isolated aluminum-boron carbide reactive phases and at most 2% by volume of isolated metal. A second aspect of the present invention is a method for preparing the improved ceramic-metal composite of the first aspect, the method comprising, a) forming boron carbide particulates into a porous body that has a porosity of at most about 35%, wherein prior to step (b) the boron particulates are heat treated at a temperature of about 1200° C. to about 1800° C. in a vacuum or inert atmosphere for one minute to 50 hours, b) infiltrating the porous body with aluminum or aluminum alloy until an infiltrated aluminum-boron carbide body is formed that has at most about 1% porosity, c) heat treating the infiltrated body for at least 25 hours at an $AlB_{24}C_4$ forming temperature of about 1000° C. to about 1100° C. to form an aluminum boron carbide composite having a continuous network of $AlB_{24}C_4$ and boron carbide, and d) subsequent to step (c) heat-treating at an aluminum depleting temperature of about 700° C. to about 900° C. for a time to form the improved aluminum boron carbide composite having an aluminum concentration of less than 2% by volume of said composite.

Surprisingly, the method according to the invention produces a ceramic-metal composite that has excellent strength, stiffness and impact resistance even when using large boron carbide particulates (e.g., 10, 20, 50, 100 micrometers or more in diameter).

The ceramic-metal composite may be used in applications benefiting from properties such as low density, high stiffness and impact resistance. Examples of components include hard drive components (e.g., E-blocks, suspension arms, disks, bearings, actuators, clamps, spindles, base plates and housing covers); brake components (e.g., brake pads, drums, rotors, housings and pistons); aerospace components (e.g., satellite mirrors, housings, control rods, propellers and fan blades); piston engine components (e.g., valves, exhaust and intake manifolds, cam followers, valve springs, fuel injection nozzles, pistons, cam shafts and cylinder liners) and other structural or recreational components (e.g., bicycle frames, robot arms, deep sea buoys, baseball bats, golf clubs, tennis rackets and arrows). Mining & oil well components, for example rock drilling bits, coring bits, auger drilling bits, hydraulic drilling bits, reverse circulation drilling bits, percussion drilling bits and sonic drilling bits.

BRIEF DESCRIPTION OF THE DRAWINGS

The FIGURE is a 50× magnification optical micrograph with a line drawn through the continuous network of the composite of this invention.

DETAILED DESCRIPTION OF THE INVENTION

The ABC Composite

The aluminum-boron carbide (ABC) composite is comprised of a continuous network of $AlB_{24}C_4$ and boron carbide grains. It is understood that the $AlB_{24}C_4$ and boron carbide ($B_4C$) may as well understood in the art deviate from stoichiometry (solid solution) and still encompass the invention. For example, the B/Al ratio of the $AlB_{24}C_4$ is typically at least 15 by mole. A continuous network of $AlB_{24}C_4$ and $B_4C$ grains means that individual grains of boron carbide are bonded through the $AlB_{24}C_4$ phase. Thus, starting from one surface of the ABC composite, one can trace an unbroken path to the opposing surface through the $AlB_{24}C_4$ and $B_4C$ phases as shown in FIG. 1. This may be determined by using known metallographic techniques (e.g., see Underwood in *Quantitative Stereology*, Addison-Wesley, Reading, Mass. (1970)).

Generally, the amount of boron carbide phase or grains is at least about 40% by volume of the ABC composite, but may be at least about 45%, 50%, 55%, 60% or 65% to at most about 90%, 85%, 80% or 75% by volume of the ABC composite. The amount of $AlB_{24}C_4$ phase or grains is typically at least about 10% by volume of the ABC composite, but may be at least about 15%, 20%, 25% or 30% to at most about 50%.

The ABC composite also contains isolated aluminum-boron carbide reactive phases and at most 2% by volume of isolated metal. The isolated metal is aluminum or a metal that is present in an aluminum alloy used to make the ABC composite (e.g., alloying metals such as Cu, Fe, Mg, Si, Mn, Cr and Zn). Desirably, the amount of free metal is as low as possible and may be at most 2%, 1.75%, 1.5% or 1% by volume of the ABC composite. The amount of aluminum may be determined, for example, using differential scanning calorimetry (DSC). Isolated means that one can not trace an unbroken path to the opposing surface through the metal and other aluminum-boron carbide reactive phases.

Other reactive phases means phases other than $AlB_{24}C_4$ that are formed by the reaction of the metal and boron carbide used to form the ABC composite. Examples of such other reactive phases are $AlB_2$, $Al_{3-4}BC$, $Al_{0.84}B_{39.8}C_4$, $AlB_{12}$, $Al_4C_3$ and $Al_8B_4C_7$. The amount of other reactive phases is typically at most about 25% by volume of the ABC composite, but may be at most about 20%, 15, 10 or 5% by volume of the ABC composite.

The metal is aluminum and alloys of aluminum, such as those that contain one or more of Cu, Mg, Si, Mn, Cr and Zn. Exemplary aluminum alloys include Al—Cu, Al—Mg, Al—Si, Al—Mn—Mg and Al—Cu—Mg—Cr—Zn. Specific examples of aluminum alloys include 6061 alloy, 7075 alloy and 1350 alloy, each available from the Aluminum Company of America, Pittsburgh, Pa.

In general, the ABC composite has a density of at least about 90% of theoretical density. Preferably, the composite has a density of at least about 95%, more preferably at least about 98%, even more preferably at least about 99% and most preferably essentially 100% of theoretical density. The ABC composite generally has a stiffness (i.e., Young's modulus) equal to or greater than a composite made not having the aforementioned continuous network (i.e., a composite made with same starting materials but not subject to processing to form said network). Preferably, the ceramic-metal composite has a stiffness greater than a composite made lacking the continuous network. Likewise, this is the same with respect to impact resistance of the ABC composite.

In a preferred embodiment, the ABC composite preferably has boron carbide grains that have an average grain size that is 25 micrometers in diameter or greater, and even 30, 40, 50, 60, 70, 80, 90, 100, 125, 150, 175, 200, 225 or 250 micrometers in diameter.

Forming of the ABC Composite

The ABC composite may be made by infiltrating a porous body comprised of boron carbide powder with an aluminum metal, alloy thereof, or combination thereof.

The boron carbide powder used to make the porous body is baked prior to or may be baked after being formed into a porous body at a temperature of 1200° C. to 1800° C. in a vacuum or inert atmosphere for a time of about 1 minute to 50 hours. It is preferable to do such baking after the porous body has been formed when using a substantial amount of larger boron carbide particulates (e.g., greater than 50 micrometers), for example, to increase the strength of the porous body. The particular temperature and time is dependent on the particular boron carbide powder (e.g., size and size distribution) and is generally chosen to be the shortest time and lowest temperature so that undesirable phases and reactivity does not occur during infiltration. The baking temperature is typically at most about 1700° C., but may be at most about 1600° C., 1550° C., 1500° C., 1450° C. or 1400° C. to typically at least about 1225° C., 1250° C. or 1300° C. The time is typically at least about 30 minutes to several hours (2-4 hours).

Herein when an atmosphere is specified as a "vacuum or inert atmosphere", it is understood to mean that the gaseous species present in the atmosphere or vacuum is such that no appreciable reaction takes place between such gaseous species with the boron carbide or aluminum at the conditions experienced under that atmosphere. No appreciable generally means that at most no more than 0.5% of the boron carbide or aluminum is reacted with a gaseous species in the atmosphere provided. Generally, inert atmosphere may be any of the noble gases or a vacuum that has a pressure of no greater than about 1 millitorr.

The porous body to be infiltrated must have a porosity no greater than about 35% so that the continuous network may be formed upon heat-treating. The porosity, however, should not be so small such that the aluminum is not able to infiltrate to make dense infiltrated ABC composite. Generally the porous body has a porosity of at most about 34%, 33%, 32%, 31%, 30%, 29%, 28%, 27%, 26%, 25%, 24%, 23%, 22%, 20%, 19%, 18%, 17%, 16% or even 15% to at least about 5%.

The boron carbide powder may have any useful average particle size such that an infiltrated ABC composite may be made with less than about 1% porosity. Generally, this means that there are sufficient amount of small particles to ensure sufficient infiltration of the aluminum metal and to react to form the $AlB_{24}C_4$. In general, this means that the boron carbide particles making up the porous body have a specific surface area of at least about 0.5 $m^2/g$. Typically, this means that at least about 10% by weight of the porous body is made up of boron carbide particles that are less than 50 micrometers in diameter and more typically at least about 10% of the porous body is made up of particles that are less than 45, 40, 35, 30, 25, 20, 15, 10 or even 5 micrometers in diameter.

In one embodiment, the porous body of boron carbide particulates is formed using at least two powders having different average particle sizes where the average size of the larger powder is at least 2 times and preferably, 3, 4, 5, 6, 7, 8, 9 or even 10 times or more larger. For example, the particle size of the large boron carbide powder may have an average particle size by weight of 100 to 5000 micrometers and the smaller boron carbide powder may have an average particle size by weight of 0.1 to 50 micrometers. When making a composite with such larger and smaller particles, the finer particles act to ensure the infiltration and formation of the $AlB_{24}C_4$ phase and the larger particulates increase the toughness or impact resistance of the final ABC composite. Particle diameter is understood to mean equivalent spherical diameter.

In general desirable weight ratios of particles greater than 50 micrometers in diameter to those less than 50 micrometers in diameter is (>50/<50) is at least 1/1, but may be at least 3/2, 2, 5/2, 3, 7/2, 4, 5, 6, 7, 8, 9, or even 10. The particular useful ratio may depend on the amount of much finer particles (e.g., less than about 10 micrometers in diameter) because of these particles greater contribution to the surface area of the porous body.

The boron carbide powder used to make the porous body may be mixed by any suitable method such as those known in the art. Examples of suitable methods include ball milling, attrition milling, ribbon blending, vertical screw mixing, V-blending and fluidized zone mixing. Ball milling in a solvent such as ethanol, heptane, methanol, acetone and other low molecular weight organic solvents with milling media, such as boron carbide media, generally provides satisfactory results. Other additives useful in the formation of the porous body from the mixture may be included such as dispersants, binders and solvent.

Suitable methods to form the porous body for infiltrating include, for example, shaping methods such as slip or pressure casting, pressing and plastic forming methods (e.g., jiggering, injection molding and extrusion). The forming of the porous body may include removing, if necessary, solvent and organic additives such as dispersants and binders after shaping of the mixture. Each of the above methods and steps are described in more detail in Introduction to the Principles of Ceramic Processing, J. Reed, J. Wiley and Sons, N.Y., 1988.

After the porous body of boron carbide particulates are formed, it is infiltrated by aluminum, aluminum alloy or combination thereof. Infiltration is the process in which a liquid metal fills the pores of the porous body in contact with the metal. Infiltration of the porous preform may be performed by any convenient method for infiltrating a metal into a preform body, such as vacuum infiltration, pressure infiltration and gravity/heat infiltration provided that the atmosphere is essentially inert to the metal and components of the porous body (e.g., vacuum or inert gas such as a noble gas). Examples of suitable infiltration methods are described by U.S. Pat. Nos. 4,702,770 and 4,834,938, each incorporated herein by reference. After the infiltration, a composite is formed that has at most about 1% porosity. The composite at this stage does not have a continuous network and needs to be further heat-treated to form such network.

Infiltration is preferably performed at a temperature where the metal is molten but below a temperature at which the metal rapidly volatilizes. For example, when infiltrating aluminum or an alloy thereof into the porous body, the temperature is preferably at most about 1300° C., and more preferably at most about 1200° C. and preferably at least about 750° C., more preferably at least about 900° C., even more preferably at least 1000° C. and most preferably at least about 1100° C. The infiltration time may be any time sufficient to infiltrate the porous body to form an infiltrated ABC body and may range, for example, from 5 minutes to 24 hours or more.

After the infiltrated ABC body is formed it is first heat treated for at least 25 hours at an $AlB_{24}C_4$ forming temperature of 1000° C. to 1100° C. to form an aluminum boron carbide composite having a continuous network of $AlB_{24}C_4$ and boron carbide. The temperature is critical as well so as to avoid deleterious phases and to ensure the formation of the continuous network. The time of 25 hours is, generally, the necessary amount of time to ensure the continuous network, but it may be longer to further improve the properties and make the network more extensive, but at some point, the time need not be longer, because little or no further reaction takes place (e.g., 1000 hours or less). A second subsequent heat-treatment then needs to be performed to reduce the free metal to realize the ABC composite of this invention.

The second heat-treating is at an aluminum depleting temperature of about 700° C. to about 900° C. for a time to form the improved aluminum boron carbide composite having an aluminum concentration of less than 2% by volume said composite. The time may be any sufficient to reduce the amount of metal (e.g., aluminum or aluminum alloy) to less than 2% by volume of the composite. Typically, this is at least about 30 minutes to 100 hours, but may be at least 1, 2, 3 or 4 hours to at most about 50, 25 20, 15, or 10 hours. The atmosphere for the first and second heat-treatments may be a vacuum, inert atmosphere or in a particular embodiment in reactive atmospheres such as oxygen or air if the composite is encapsulated. Such an encapsulation may be realized by using an excess of infiltrant metal such that the body is encapsulated by the excess metal sealing it from the atmosphere when heat-treating.

Below are specific examples within the scope of the invention and comparative examples. The specific examples are for illustrative purposes only and in no way limit the invention described herein.

EXAMPLES

Example 1

A ceramic-metal composite was made by first mixing boron carbide powders F80 grit, F400 grit and F1500 grit in mass ratio 55:35:15.

The porous body was placed on a graphite setter and baked under argon atmosphere for • 30 minutes at a temperature • 1200° C. The baked porous body was placed on a piece of aluminum in a refractory crucible. This assemblage was placed in a furnace. The furnace was heated to 1160° C. and maintained at that temperature for about 3 hours under vacuum to infiltrate the porous body with aluminum.

The infiltrated body was first heat treated at 1050° C. for 50 hours in air.

The first heat-treated body was further heat treated at 800° C. for 100 hours in air.

The improved composite that was formed had a metal content of <2%, stiffness, hardness and impact resistance as shown in Table 1. The impact resistance is assessed after dropping a 4 pound load from a height of 5 inches on to a plate of material having surface area of about 9 to 16 square inches, i.e., plate of about 3"-4" by 3"-4", and areal density of ~4.5 lbs/sq-ft). The microstructure is shown in FIG. 1, where the continuous network is readily shown.

Example 2

In Example 2, an improved ceramic-metal composite was made by the same method of Example 1, except the heat treatment parameters were changed.

The infiltrated body was first heat treated at 1050° C. for 100 hours in air.

The first heat-treated body was further heat treated at 800° C. for 50 hours in air.

The resultant ceramic-metal composite's characteristics are shown in Table 1.

Example 3

In Example 3, an improved ceramic-metal composite was made by the same method of Example 1 except that the boron carbide powders were different and initial heat treatment was heat-treated at 1050° C. for 100 hours in air as shown in Table 1. The resultant ceramic-metal composite's characteristics are shown in Table 1.

Comparative Example 1

In Comparative Example 1 a ceramic-metal composite was formed by the same process as described in Example 1 except that no heat-treatment was performed. This composites characteristics are shown in Table 1.

Comparative Example 2

Comparative Example 2 is a commercially available sintered silicon carbide available under the tradename Hexoloy SA, available from Saint-Gobain Ceramics, Structural Ceramics Group, Hexoloy® Products, 23 Acheson Drive, Niagara Falls, N.Y. 14303. The characteristics of this ceramic are shown in Table 1.

Comparative Example 3

Comparative Example 3 is a commercially available alumina available under the tradename CoorsTek CeraShield® CAP3 alumina, available from CoorsTek, 600 Ninth Street, Golden, Colo. 30401 USA. The characteristics of this ceramic are shown in Table 1 as well as the impact resistance.

From Table 1, it is clear that the impact resistance is improved compared to a like boron carbide composite that does not have the continuous network and low aluminum content (Examples 1-3 versus Comparative Example 2). Likewise, the hardness and stiffness of the inventions composite has much improved hardness and stiffness compared to a composite having substantial amounts of aluminum (Examples 1-3 v. Comparative Example 1. The higher hardness along with excellent impact resistances would exhibit improved wear and durability than a composite with substantial amounts of aluminum.

TABLE 1

| Ex. | 1st B$_4$C Grade | 2nd B$_4$C Grade | 3rd B$_4$C Grade | 1st B$_4$C (pbw) | 2nd B$_4$C (pbw) | 3rd B$_4$C (pbw) | Density of Porous Body (% of $\rho_{th}$) | 1$^{st}$ heat treatment (° C.) | 2$^{nd}$ heat treatment (° C.) | Density of Composite (% of $\rho_{th}$) | Al (%) | Hardness (Kg/mm) | Stiffness (GPa) | Impact Damage |
|---|---|---|---|---|---|---|---|---|---|---|---|---|---|---|
| 1 | F80 | F400 | F1500 | 55 | 35 | 15 | 73 | 1050 | 800 | ~100 | <2% | ~1100 | 360 | Slight |
| 2 | F80 | F400 | F1500 | 55 | 35 | 15 | 72 | 1050 | 800 | ~100 | — | ~1230 | 350 | None |
| 3 | F500 | F1500 | — | 30 | 70 | — | 70 | 1050 | 800 | ~100 | <2% | | 380 | None |
| Comp 1 | F80 | F400 | F1500 | 55 | 35 | 15 | 73 | None | none | ~100 | ~20-25 | ~290 | 280 | None |
| Comp 2 | F1500 | — | — | 100 | — | — | — | 850 | none | ~100 | — | | 305 | Severe |
| Comp 3 | F1500 SiC | — | — | — | — | — | — | — | — | >98 | N.A. | 2800 | 410 | Severe |
| Comp 4 | α-Al$_2$O$_3$ | — | — | — | — | — | — | — | — | >99.5 | N.A. | 1440 | 370 | Moderate |

Grades of boron carbide available from Elektroschemeltzwerk Kempten, Munich Germany and Mudanjiang Jingangzuan Boron Carbide Co., LTD.
Severe = High deformation, lager impact site damage >5 mm, cracking noticeably separated part
Moderate = Noticeable deformation, large impact damage ~4 mm, cracking separated part
Slight = Minimal deformation, small impact site damage ~2 mm, through cracks

What is claimed is:

1. An aluminum-boron carbide composite comprised of a continuous network of AlB$_{24}$C$_4$ and boron carbide grains and the aluminum-boron carbide composite also contains isolated aluminum-boron carbide reactive phases and at most 2% by volume of isolated metal.

2. The aluminum-boron carbide composite of claim 1, wherein the boron carbide grains have an average diameter of at least 50 micrometers.

3. The aluminum-boron carbide composite of claim 2 wherein average size is at least 100 micrometers.

4. The aluminum-boron carbide composite of claim 3 wherein the average size is at least 150 micrometers.

5. The aluminum-boron carbide composite of claim 4 wherein the AlB$_{24}$C$_4$ is present in said composite in an amount of at least about 10% by volume.

6. The aluminum-boron carbide composite of claim 5 wherein the isolated aluminum-boron carbide reactive phase is comprised of AlB$_2$, Al$_4$BC, Al$_3$B$_{48}$C$_2$, AlB$_{12}$, Al$_4$C$_3$ or mixtures thereof.

* * * * *